(12) United States Patent
Neumann et al.

(10) Patent No.: US 9,212,062 B2
(45) Date of Patent: *Dec. 15, 2015

(54) POROUS CARBON PRODUCT AND METHOD FOR PRODUCING AN ELECTRODE FOR A RECHARGEABLE LITHIUM BATTERY

(75) Inventors: Christian Neumann, Hungen (DE); Jörg Becker, Niddatal (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 319 days.

This patent is subject to a terminal disclaimer.

(21) Appl. No.: 13/523,237

(22) Filed: Jun. 14, 2012

(65) Prior Publication Data

US 2013/0028831 A1    Jan. 31, 2013

Related U.S. Application Data

(60) Provisional application No. 61/512,349, filed on Jul. 27, 2011.

(51) Int. Cl.
*C01B 31/00* (2006.01)
*C04B 38/00* (2006.01)
*C04B 111/00* (2006.01)

(52) U.S. Cl.
CPC .............. *C01B 31/00* (2013.01); *C04B 38/0022* (2013.01); *C04B 38/0032* (2013.01); *C04B 2111/00853* (2013.01)

(58) Field of Classification Search
CPC ............ C04B 38/0022; C04B 38/0032; C04B 2111/00853; H01M 10/052; H01M 4/133; H01M 4/1393; H01M 4/587; H01M 4/8882; H01M 4/96; Y02E 60/122; Y02E 60/50; C01B 31/00
USPC ............................................ 423/449.1, 449.8
See application file for complete search history.

(56) References Cited

U.S. PATENT DOCUMENTS 4,263,268 A    4/1981   Knox et al.
7,449,165 B2   11/2008  Dai et al.
(Continued)

FOREIGN PATENT DOCUMENTS

CN    1544321 A      11/2004
DE    29 46 688 A1   12/1980
(Continued)

OTHER PUBLICATIONS

Synthesis of Highly Ordered Carbon Molecular Sieves via Template-Mediated Structural Transformation Ryong Ryoo, Sang Hoon Joo, and, and Shinae Jun The Journal of Physical Chemistry B 1999 103 (37), 7743-7746.*

(Continued)

*Primary Examiner* — Richard M Rump
(74) *Attorney, Agent, or Firm* — Tiajoloff and Kelly LLP

(57) ABSTRACT

A known method for producing a porous carbon body comprises providing a template of inorganic template material which comprises interconnected pores, providing a precursor substance for carbon, infiltrating the pores of the template with the precursor substance, carbonizing the precursor substance and removing the template with formation of the porous carbon product. Starting therefrom, to provide a method which allows a cost-effective production of a porous carbon structure also with thick wall thicknesses, it is suggested according to the invention that precursor substance particles of fusible material and template particles are provided and a powder mixture is formed from the particles, and that the powder mixture is heated before or during carbonization according to method step (d) in such a manner that precursor substance melt penetrates into the pores of the template particles.

16 Claims, 2 Drawing Sheets

(56) References Cited

U.S. PATENT DOCUMENTS

| | | | |
|---|---|---|---|
| 2005/0169829 A1 | 8/2005 | Dai et al. | |
| 2008/0066497 A1* | 3/2008 | Weber et al. | 65/17.6 |
| 2009/0044606 A1 | 2/2009 | Dai et al. | |
| 2009/0304570 A1 | 12/2009 | Kim et al. | |
| 2010/0008021 A1* | 1/2010 | Hu et al. | 361/502 |
| 2011/0082024 A1 | 4/2011 | Liu et al. | |
| 2011/0140296 A1 | 6/2011 | Dai et al. | |
| 2011/0262993 A1* | 10/2011 | Backov et al. | 435/188 |
| 2011/0312080 A1 | 12/2011 | Hatton et al. | |
| 2012/0301387 A1 | 11/2012 | Neumann | |

FOREIGN PATENT DOCUMENTS

| | | |
|---|---|---|
| JP | 62 096324 A | 5/1987 |
| WO | WO 2007137794 A1 * | 12/2007 |
| WO | 2009 149540 A1 | 12/2009 |
| WO | 2010 027854 A1 | 3/2010 |
| WO | WO 2010049650 A2 * | 9/2010 |
| WO | 2010 150859 A1 | 12/2010 |
| WO | 2012 119666 A1 | 3/2012 |

OTHER PUBLICATIONS

Yang, Nancy YC, et al. "Template synthesis of nanophase mesocarbon." Journal of nanoscience and nanotechnology 3.5 (2003): 386-391.*

Bange, Jaspal P., Lalit S. Patil, and Dinesh Kumar Gautam. "Growth and characterization of SiO 2 films deposited by flame hydrolysis deposition system for photonic device application." Progress in Electromagnetics Research M 3 (2008): 165-175.*

Klepel et al., Several Ways to Produce Porous Carbon Monoliths by Template Assisted Routes, Materials Letters 61, 2037-2039, Germany 2007.

Petit et al., Experimental Study of SiO2 Soot Deposition using the Outside Vapor Deposition Method, Aerosol Science and Technology, 44:5, 388-394, 2010.

Computer generated English translation of CN 1544321 A.

Espacenet English language abstract of CN 1544321 A, published Nov. 10, 2004.

Computer generated English translation of JP 62 096324 A.

Jian et al., "Mesoporous carbons with Self-assembled Surfaces of Defined Crystal Orientation," Microporous and Mesoporous Materials 108, pp. 143-151 (2008).

* cited by examiner

POROUS CARBON PRODUCT AND METHOD FOR PRODUCING AN ELECTRODE FOR A RECHARGEABLE LITHIUM BATTERY

RELATED APPLICATIONS

This application claims the benefit of U.S. provisional application Ser. No. 61/512,349 filed Jul. 27, 2011.

The present invention refers to a method for producing a porous carbon product, the method comprising the following steps:
(a) providing a template consisting of inorganic template material which comprises interconnected pores;
(b) providing a precursor substance for carbon;
(c) infiltrating the pores of the template with the precursor substance;
(d) carbonizing the precursor substance;
(e) removing the template with formation of the porous carbon product.

Furthermore, the present invention refers to a suitable use of the carbon product.

Monolithic shaped bodies of carbon are e.g. used in electrodes for fuel cells, supercapacitors and electric accumulators (secondary batteries) and employed as adsorbents for liquids and gases, as storage medium for gases, as carrier material in chromatographic applications or catalytic processes and as material in mechanical or medical engineering.

PRIOR ART

The use for electrodes of rechargeable lithium batteries requires an electrode material which is able to reversibly intercalate and deintercalate lithium at a low charge loss. At the same time one aims at charging times as short as possible and at high charging capacities of the battery. To this end maximum porosity (permeability) is desired together with a surface of the electrode material that is as small as possible at the same time. Electrode materials with a large surface exhibit a relatively high charge loss that manifests itself substantially as an irreversible loss during the first intercalation of lithium.

DE 29 46 688 A1 discloses methods for producing porous carbon by using a temporary preform of porous material (a so-called template). A precursor substance for carbon is here deposited in the pores of the template of inorganic template material that has a surface of at least 1 $m^2/g$. $SiO_2$ gel, porous glass, alumina or other porous heat-resistant oxides are named as suitable template materials for the template. The template material has a porosity of at least 40% and a mean pore size ranging from 3 nm to 2 µm.

Polymerizable organic materials, such as a mixture of phenol and hexamine or a phenol-formaldehyde resole, are recommended as precursor substance for carbon. This mixture is introduced as a liquid or as a gas into the pores of the template and polymerized. After polymerization and subsequent carbonization the inorganic template material of the template is removed, e.g. by dissolution in NaOH or in hydrofluoric acid.

This yields a particle- or flake-like carbon product which has a pore structure corresponding approximately to the material distribution of the template and which is in principle suited as a start material for the manufacture of electrodes for Li batteries.

Easy access to the inner surfaces is decisive for a high and fast charging capability. In this context a so-called "hierarchical porosity" turns out to be advantageous. Large surfaces can be provided by pores in the nanometer range. To enhance the accessibility to these pores, they are ideally connected via a continuous macroporous transport system.

A monolithic carbon product with such a hierarchical pore structure of macropores and mesopores is described in US 2005/0169829 A1. To make the hierarchical pore structure, a $SiO_2$ template is produced in that a dispersion consisting of silica beads with diameters of from 800 nm to 10 µm and of a polymerizable substance is heated in a mold so that polymerization yields a porous silica gel that after removal of the excessive liquid is dried and completely polymerized.

The pores of the $SiO_2$ template obtained in this way are subsequently impregnated with a precursor substance for carbon, the carbon precursor substance is carbonized into carbon and the $SiO_2$ template is subsequently removed by dissolution in HF or NaOH. The carbon product obtained thereby also exhibits a pore structure conforming approximately to the material distribution of the template. Phenolic resin dissolved in tetrahydrofurane (THF) is used as the precursor substance.

Technical Objective

Common graphitizable carbon precursor materials for infiltration are not soluble in a high concentration and contain an amount of insoluble constituents. For instance, the solubility of mesophase pitch in THF is less than 10% by vol., so that after evaporation of the solvent more than 90% of the originally filled pore volume remains unfilled. The volume of the remaining coating of carbon precursor material is further reduced, though insignificantly, by subsequent carbonization.

Inversely, alternative carbon precursors in the form of carbohydrates, such as sugar, show high solubility, but the sugar remaining after evaporation of the solvent loses about 50% of its original mass in the carbonizing process, so that also here a large pore volume remains unfilled.

Therefore, infiltration with subsequent carbonization generally yields only small thicknesses of the deposited carbon layer. To achieve technically useful wall thicknesses of the porous carbon structure, a plurality of such infiltration and carbonization processes have therefore to be performed one after the other as a rule. Such multiple processes, however, increase the manufacturing costs and they may cause inhomogeneities, e.g. due to the gradual clogging of infiltration channels.

It is the object of the present invention to provide a method that allows a cost-effective production of a porous carbon structure also with thick wall thicknesses.

Furthermore, it is the object of the present invention to indicate a suitable use of the carbon product according to the invention.

General Description of the Invention

As for the method, this object starting from a method of the aforementioned type is achieved according to the invention in that precursor substance particles of fusible material as well as template particles are provided and a powder mixture is made from the particles, and that the powder mixture is heated before or during carbonization according to method step (d) in such a way that precursor substance melt penetrates into the pores of the template particles.

In the method according to the invention the precursor substance for carbon is heated in contact with the template and softened or melted in this process, so that it can penetrate into the pores of the template. A solvent for the carbon precursor substance can be omitted.

It has however been found that even in the case of a good wettability of the template material this "direct infiltration" of the template with liquefied precursor substance will not produce the desired success if the template is present as a monolith. Without special precautions one will obtain an excessively small penetration depth for the molten precursor substance as well as an irregular occupation in the pores. To solve this problem, powders produced in advance from both the porous template material and the precursor substance are provided according to the invention, said powders are homogeneously mixed with one another and the homogenous powder mixture is heated to such a degree that the particles of the precursor substance will melt.

This melt can directly penetrate into the neighboring template particles. The homogeneous powder mixture ensures that molten precursor substance is always in intimate contact with the template particles, so that a uniform distribution and occupation is achieved over the whole pore volume of the template material to be infiltrated. The high temperature prevailing during the melting of the precursor substance contributes to a better wettability of the surfaces of the template, so that even in the case of a single infiltration a high filling degree of the pore volume is already obtained.

Carbonization of the precursor substance takes place at the same time or subsequent to the infiltration of the pores of the template particles. Since the use of a solvent is dispensed with, shrinkage of the precursor substance is solely due to the decomposition and evaporation processes during carbonization. The degree of shrinkage depends in this respect only on the carbon content of the precursor substance.

The inorganic template material just serves as a mechanically and thermally stable skeleton for depositing and calcining the carbon precursor substance. After removal, e.g. by chemical dissolution, the resulting carbon product is substantially free of template material.

The more finely divided the template particles are, the faster, more efficient and more uniform will be the infiltration under otherwise identical process conditions. The template particles are e.g. produced by grinding porous bodies from the template material or by crushing layers from the template material, by pressing a powder from the template material or by sol-gel methods or granulation methods. A small, ideally monodisperse, particle size distribution which is e.g. achieved by sieving is advantageous for the method according to the invention.

The powder of the precursor substance can also be obtained by grinding or crushing or by atomizing a melt.

After the two powders have been homogeneously mixed with each other, the powder mixture is heated to such a degree that the precursor substance gets molten and penetrates in a strongly wetting manner into the pores of the template powder. The precursor substance can here be carbonized at the same time or subsequently.

After carbonization one obtains a mass in which carbonized precursor substance and template material are intimately mixed with each other. The template material is removed by etching from said mass, so that a carbon skeleton from the carbonized precursor substance will remain.

It has turned out to be particularly advantageous when providing the template particles comprises a soot deposition process in which a feedstock material is converted by hydrolysis or pyrolysis into template material particles and said particles are deposited on a deposition surface with formation of a soot body from the template material, and that the soot body is fragmentized into the template particles.

In this variant of the method according to the invention the formation of the template comprises a soot deposition process. In this process a liquid or gaseous start substance is subjected to a chemical reaction (hydrolysis or pyrolysis) and is deposited from the gas phase as a solid component on a deposition surface. The reaction zone is e.g. a burner flame or an electric arc (plasma). With the help of such plasma or CVD deposition methods, which are e.g. known under the names OVD, VAD, MCVD, PCVD or FCVD methods, synthetic quartz glass, tin oxide titanium nitride and other synthetic materials are produced on an industrial scale.

It is here essential for the qualification of the deposited template material for the production of a template that the template material is present on the deposition surface, which may e.g. be a vessel, a mandrel, a plate or a filter, as porous soot. This is ensured in that the temperature of the deposition surface is kept so low that a dense sintering of the deposited template material is prevented. A "soot body" which is thereby thermally consolidated, but porous, is obtained as an intermediate product.

In comparison with the production method via the "sol-gel route", the soot deposition method is an inexpensive method that permits a cost-effective production of templates on an industrial scale.

With the soot bodies obtained in this way it has turned out to be particularly advantageous that these exhibit an anisotropic mass distribution with a hierarchical pore structure due to the manufacturing process. The reason is that gas phase deposition yields, in the reaction zone, primary particles of the template material with particle sizes in the nanometer range that agglomerate on their way to the deposition surface and are present in the form of more or less spherical agglomerates or aggregates on the deposition surface; these shall also be called "secondary particles" hereinafter. Within the primary particles and within the secondary particles, i.e. between the primary particles, there are particularly small cavities and pores in the nanometer range, i.e. so-called mesopores, whereas greater cavities or pores are formed between the individual secondary particles.

The template particles obtained therefrom by crushing or grinding also exhibit the hierarchical structure with oligomodal pore size distribution that is predetermined in the template material.

In the soot deposition process the template material can also be produced in the form of soot powder that is subsequently further processed in granulation, press, slurry or sintering processes into the template particles. Granules or flakes should be mentioned as intermediate products.

The layer of the template material produced by soot deposition can be fragmentized with little effort, resulting in template particles with platelet- or flake-like morphology.

Such template particles that are distinguished by a non-spherical morphology are particularly advantageous for use in the method according to the invention.

The reason is that particles with spherical morphology, i.e. particles with a ball shape or an approximately ball-shaped morphology, have a small surface in relation to their volume. By contrast, particles with a non-spherical morphology show a greater ratio of surface to volume, which simplifies and equalizes the infiltration with the precursor substance.

Template particles that are platelet- or rod-shaped with a structure ratio of at least 5, preferably at least 10, turn out to be particularly advantageous in this respect.

"Structure ratio" is here understood as the ratio of maximum structure width of the particle and its thickness. Consequently, a structure ratio of at least 5 signifies that the maximum structure width of a particle is at least five times greater than its thickness. Such particles have a substantially platelet- or rod-shaped form and are distinguished by two substantially parallel-extending large surfaces via which the infiltration of the molten precursor substance can take place relatively rapidly because the thickness of the volume to be filled is comparatively small.

The smaller the thickness of the template particles, the simpler and more homogeneous is the infiltration with the molten precursor substance. In this respect it has turned out to be advantageous when the template particles have a mean thickness in the range of from 10 μm to 500 μm, preferably in the range of from 20 μm to 100 μm, particularly preferably less than 50 μm.

Template particles with a thickness of less than 10 μm have a small mechanical strength and aggravate the formation of a pronounced hierarchical pore structure. At thicknesses of more than 500 μm it gets more and more difficult to ensure a homogeneous infiltration with the molten precursor substance.

A homogeneous mixing of the particles from template material and precursor material is facilitated when the precursor substance particles are made spherical and have a mean particle size of less than 50 μm, preferably less than 20 μm.

Owing to the spherical formation of the particles the mixing with the non-spherical particles from the template material is improved. This is also supported when the particles from the precursor substance are slightly smaller than the particles of the precursor substance. Particle sizes of less than 1 μm, however, tend to get dusty and are not preferred.

The filling degree of the pores is set by the mixing ratio of precursor substance and template material. Preferably, precursor substance particles and template particles are intermixed in a volume ratio in the range between 0.05 and 1.6, preferably in a volume ratio in the range between 0.1 and 0.8.

At a mixing ratio of 0.05 the inner surfaces of the template material are covered with only one layer of a small thickness, so that just a sponge-like web of carbon is obtained. Mixing ratios that are even smaller are therefore not preferred. By contrast, at a mixing ratio of 1.6 one obtains a substantially filled pore structure, depending on the original pore volume of the template material.

Preferably, the template material is $SiO_2$.

Synthetic $SiO_2$ can be produced at relatively low costs on an industrial scale by means of soot deposition methods using inexpensive start substances. The $SiO_2$ template withstands high temperatures during calcining. The upper temperature limit is predetermined by the start of the reaction of $SiO_2$ with carbon into SiC (at about 1000° C.). The removal of the template material in the form of synthetic $SiO_2$ according to method step (e) takes place by way of chemical dissolution.

Pitch is preferably suited as the carbon precursor substance.

Pitch, particularly "mesophase pitch", is a carbonaceous material that has an ordered liquid crystal structure. After carbonization the pitch melt infiltrated into the pores of the carbon structure leads to a graphite-like deposition of carbon which forms the shell of the core/shell composite and thereby closes the micropores of the carbon structure without clogging the cavities between the stacks of layers.

Alternatively, carbohydrate is used as the carbon precursor substance.

Carbohydrates, particularly sugar, such as saccharose, fructose or glucose, are non-graphitic carbon precursor substances.

Preferably, the carbon product is divided into finely divided carbon of porous particles.

In the method according to the invention the carbon product is normally obtained as a monolith or with platelet- or flake-like morphology and can be easily divided into smaller particles. The particles obtained after division have the hierarchical pore structure due to the structure of the template and are for instance further processed by means of standard paste or slurry methods into shaped bodies or layers.

As for the use of the carbon product, the aforementioned object is achieved according to the invention in that a porous carbon product according to the invention is used for producing an electrode for a rechargeable lithium battery.

Electrodes for rechargeable lithium batteries comprise both electrodes composed of carbon layers from a single material and composite electrode composed of plural materials.

EMBODIMENT

The invention will now be explained in more detail with reference to an embodiment and a drawing. In detail, FIG. 1 shows a device for producing a $SiO_2$ soot body in a schematic illustration;

Figure 1:
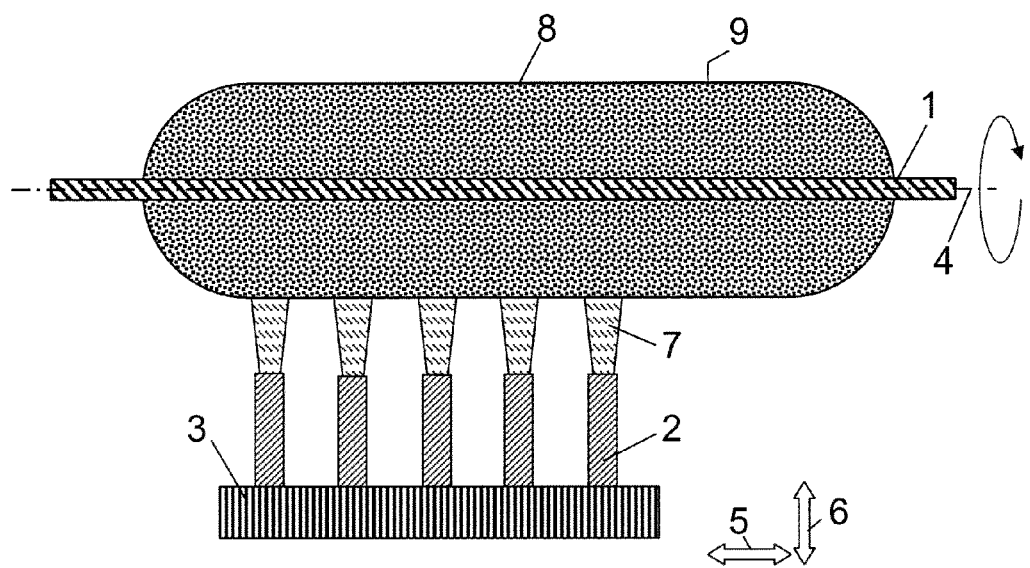

The device shown in FIG. 1 serves to produce a $SiO_2$ soot body. Plural flame hydrolysis burners 2 that are arranged in a row are disposed along a carrier tube 1 of aluminum oxide. The flame hydrolysis burners 2 are mounted on a joint burner block 3 which is reciprocated in parallel with the longitudinal axis 4 of the carrier tube 1 between two turning points that are stationary relative to the longitudinal axis 4, and which is movable in a direction perpendicular thereto, as outlined by the directional arrows 5 and 6. The burners 2 consist of quartz glass; their distance from each other is 15 cm.

The flame hydrolysis burners 2 have each assigned thereto a burner flame 7 the main propagation direction of which is perpendicular to the longitudinal axis 4 of the carrier tube 1. With the help of the flame hydrolysis burners 2 $SiO_2$ particles are deposited on the cylinder jacket surface of the carrier tube 1 which is rotating about its longitudinal axis 4 so that the porous $SiO_2$ blank 8 is built up layer by layer with an outer diameter of 400 mm. The individual $SiO_2$ soot layers have a thickness of about 50 μm on average.

The flame hydrolysis burners 2 are each fed with oxygen and hydrogen as burner gases and with $SiCl_4$ as feedstock for the formation of the $SiO_2$ particles. The burner block 3 is here reciprocated with an amplitude of two burner distances (i.e. 30 cm). During the deposition process a mean temperature of about 1200° C. is set on the blank surface 9.

After completion of the deposition process a tube of porous $SiO_2$ soot (soot tube) is obtained with a length of 3 m, an outer diameter of 400 mm and an inner diameter of 50 mm. The temperature during the formation of the soot body is kept comparatively low, so that the $SiO_2$ soot material has a low relative mean density of 22% (based on the density of quartz glass 2.21 $g/cm^3$).

Preliminary Tests (1) In a first test mesophase pitch was heated in a container in nitrogen to 300° C., resulting in a viscous pitch bath. A monolithic sample of the $SiO_2$ soot body was immersed into the pitch bath and removed again after 30 min. It was found that the molten pitch had only penetrated over a thickness of less than 1 mm into the soot body.

(2) The temperature of the pitch bath was then raised to 400° C. The mesophase pitch is still viscous at this temperature. A significant increase in the degree of infiltration in the soot body was not achieved. At a temperature around 500° C. the pitch starts to coke and evaporates noticeably.

First Example

A sample of the soot body was ground. Since the soot body is built up layer by layer, layers that are positioned one on top of the other show a tendency to ablation at the presence of high mechanical forces, so that non-spherical, platelet- or flake-like particles with a thickness in the range of 20 μm to 50 μm are obtained. The particle size fraction with side lengths between 500 μm and 1,000 μm was separated by sieving for the purpose of further processing. The ratio of maximum structure width (mean value) and mean thickness is about 20.

A pitch powder consisting essentially of spherical particles with particle sizes between 5 μm and 20 μm was prepared by grinding mesophase pitch and by sieving.

The pitch powder and the soot body particles were homogeneously intermixed in the volume ratio of 1.6:1 and the particle mixture was heated to a temperature of 300° C. The viscous pitch surrounds the small $SiO_2$ soot body particles and penetrates into the pores. The ratio of pitch and soot-body particle volume is chosen such that the pitch fills the pores, so that no significant free pore volume remains any more and is here consumed almost completely.

After an infiltration period of 30 min the temperature is raised to 700° C. and the pitch is thereby carbonized. A porous composite mass is formed from non-spherical porous $SiO_2$ particles which are occupied on the outside and on the inside (i.e. the inner walls of the pores) with a layer of graphitizable carbon.

The $SiO_2$ soot body particles are subsequently removed in that the composite mass is introduced into a fluoric acid bath. After the $SiO_2$ particles have been etched off, a pre-product of porous carbon is obtained with a structure that substantially represents a negative copy of the original $SiO_2$ soot body particles (hereinafter also called "inverse template"). The inverse template is distinguished by a hierarchical pore structure in which a great number of relatively large pore channels (macropores) extend through an otherwise finely fissured surface structure.

Figure 2:
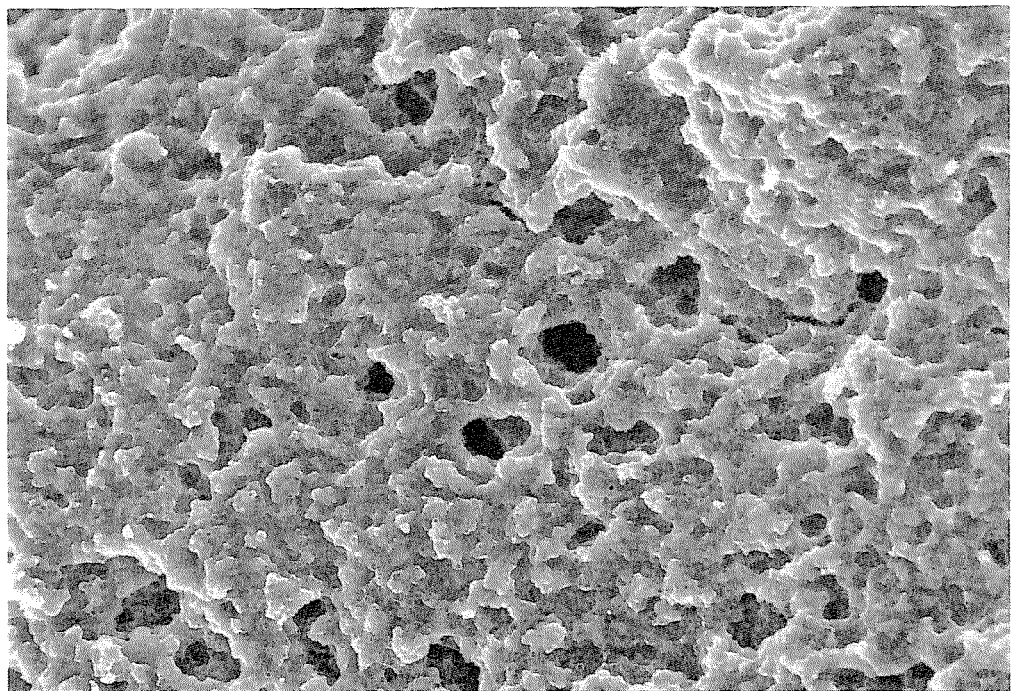
FIG. 2 shows a SEM image of a first embodiment of the porous carbon product obtained according to the method of the invention with hierarchical pore structure.

The inverse template is purged, dried, and fragmentized, whereby it decomposes into carbon flakes. The SEM image according to FIG. 2 shows the carbon structure obtained thereby with a multitude of coherent pores and cavities of different sizes. Cavities of a larger size extend through the finely fissured surface in the manner of channels. A measurement of the specific inner surface area according to the BET method yields measurement values of about 25 $m^2/g$.

Second Example $SiO_2$ soot body particles and particles of mesophase pitch were produced, as described with reference to Example 1. The pitch powder and the soot body particles were homogeneously mixed with one another in the volume ratio of 0.4:1 and the particle mixture was heated to a temperature of 300° C. The viscous pitch surrounds the small $SiO_2$ soot body particles and penetrates into the pores. The ratio of pitch and soot body particles has been chosen such that the pitch cannot completely fill the pores.

After infiltration and carbonization as explained with reference to Example 1, a porous composite mass is obtained in which the non-spherical porous $SiO_2$ soot body particles are occupied on the outside and partly on the inside with a layer of graphitizable carbon. The $SiO_2$ soot body particles are then removed by etching in hydrofluoric acid, resulting in a pre-product of porous carbon the structure of which derives from the original soot body particles and which is configured as a fine web with thin walls in which, however, a multitude of relatively large pore channels extend through an otherwise finely fissured surface structure.

Figure 3:
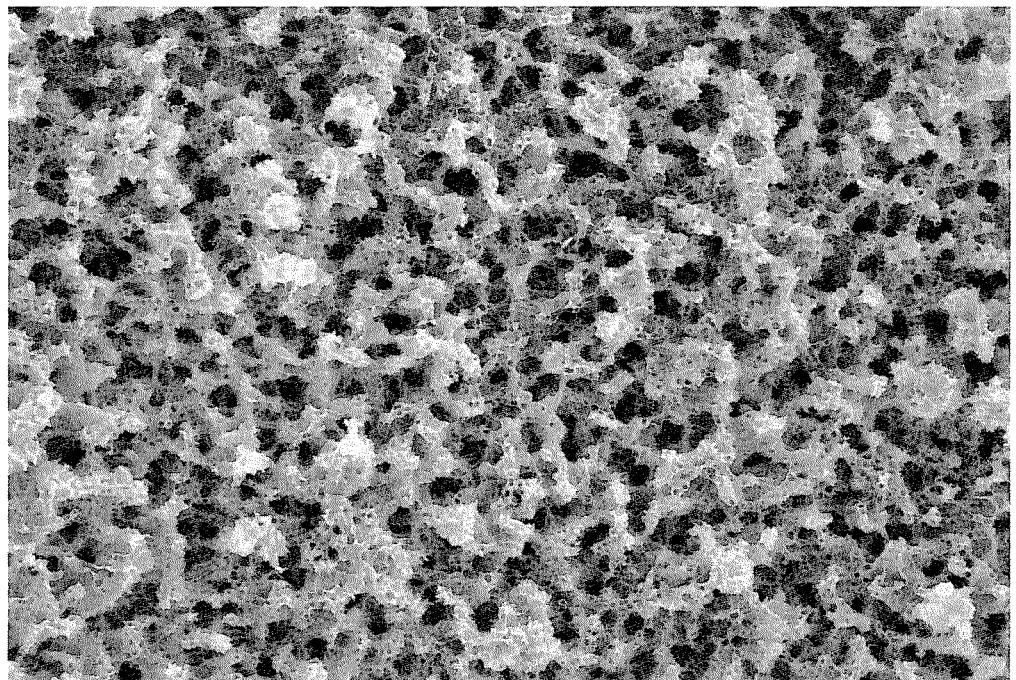
FIG. 3 shows a SEM image of a second embodiment of the porous carbon product obtained according to the method of the invention with hierarchical pore structure.

The carbon product readily decomposes into carbon flakes. The SEM image according to FIG. 3 shows the structure thereof. A multitude of coherent pores and cavities of different sizes extend in the manner of channels through the finely fissured surface. A measurement of the specific inner surface area according to the BET method yields measurement values of around 50 $m^2/g$.

Figure 4:
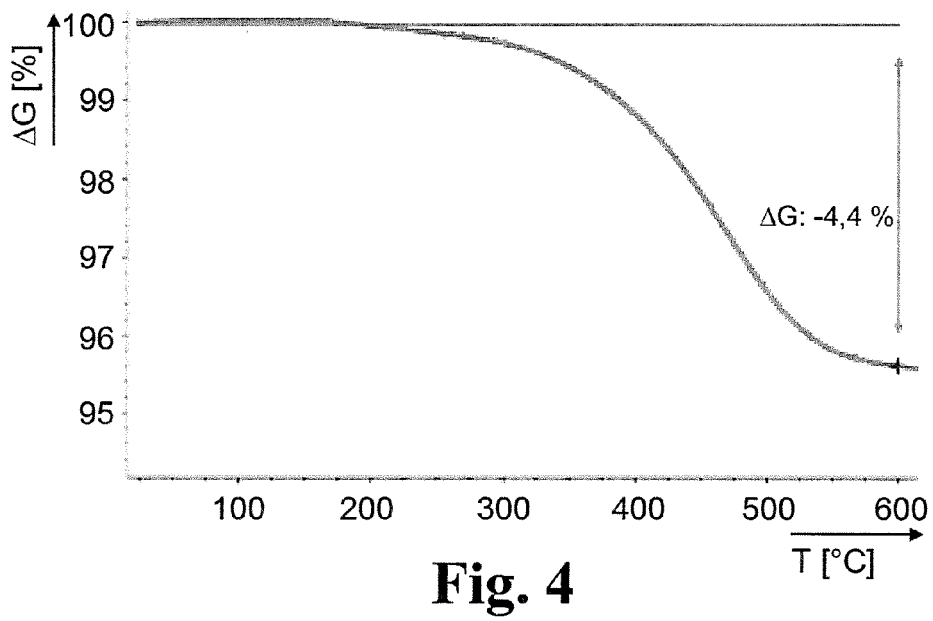
FIG. 4 shows a diagram for the thermogravimetric analysis during heating of a pitch-infiltrated template in an oxygen-containing atmosphere.

FIG. 4 shows the result of a thermogravimetric analysis (according to DIN 51005 and DIN 51006) during treatment of a sample of the pitch-impregnated soot-body particle mass according to Example 1 prior to carbonization. The sample is heated in pure argon and the weight loss is here measured. The weight loss $\Delta G$ in %, based on the initial weight, is plotted on the y-axis, and the treatment temperature T in ° C. on the x-axis.

Thus, starting from a temperature of about 300° C., a first weight reduction is observed that can be ascribed to the burning of active carbon centers and to subsequent carbonization. Up to a temperature of about 600° C. the weight decrease is 4.4% and then ends in a saturation corresponding to the weight of the pure carbon layer.

The carbon flakes obtained according to the method of the invention consist of porous carbon with hierarchical structure. They are particularly well suited for producing electrode layers of rechargeable lithium batteries, particularly for composite electrodes.

The invention claimed is:

1. A method for producing a porous carbon product, the method comprising the following steps:
    (a) providing a template comprising template particles of inorganic template material having interconnected pores, said providing comprising
        i) converting a feedstock material into the inorganic template material by flame hydrolysis or pyrolysis,
        ii) depositing the inorganic template material on a deposition surface so as to form a soot body, and
        iii) fragmentizing the soot body so as to form the template particles;
    (b) providing a precursor substance for carbon comprising precursor substance particles of fusible material;
    (c) infiltrating the pores of the template with the precursor substance;
    (d) carbonizing the precursor substance;
    (e) removing the template so as to form the porous carbon product,
        wherein a powder mixture is formed from the template particles and the precursor substance, and
        wherein the powder mixture is heated before or during the carbonizing so as to form a melt of the precursor substance that penetrates into the pores of the template particles.

2. The method according to claim 1, wherein the template particles have a non-spherical morphology.

3. The method according to claim 2, wherein the template particles are platelet- or rod-shaped with a structure ratio of at least 5.

4. The method according to claim 1, wherein the template particles have a mean thickness in a range of 10 μm to 500 μm.

5. The method according to claim 1, wherein the precursor substance particles are made spherical and have a mean particle size of less than 50 μm.

6. The method according to claim 1, wherein the precursor substance particles and the template particles in the powder mixture are intermixed in a volume ratio in a range between 0.05 and 1.6.

7. The method according to claim 1, wherein the template material is $SiO_2$.

8. The method according to claim 1, wherein the carbon precursor substance is pitch.

9. The method according to claim 1, wherein the carbon precursor substance is carbohydrate.

10. The method according to claim 1, wherein the carbon product is divided into finely divided carbon of porous particles.

11. Method for producing an electrode for a rechargeable lithium battery comprising producing the porous carbon product according to claim 1; and forming the electrode therefrom.

12. The method according to claim 2, wherein the template particles are platelet- or rod-shaped with a structure ratio of at least 10.

13. The method according to claim 1 wherein the template particles have a mean thickness in a range of 20 μm to 100 μm.

14. The method according to claim 12, wherein the mean thickness of the template particles is less than 50 μm.

15. The method according to claim 5, wherein the mean particle size of the precursor material particles is less than 20 μm.

16. The method according to claim 1, wherein the precursor substance particles and the template particles in the powder mixture are intermixed in a volume ratio in a range between 0.1 and 0.8.

* * * * *